United States Patent Office 3,376,142
Patented Apr. 2, 1968

3,376,142
METHOD FOR CONTROLLING APPLE SCALD
Hilary F. Goonewardene, Moorestown, N.J., assignor to Smith Kline & French Laboratories, Philadelphia, Pa., a corporation of Pennsylvania
No Drawing. Filed Dec. 28, 1964, Ser. No. 421,647
6 Claims. (Cl. 99—154)

ABSTRACT OF THE DISCLOSURE

Compounds comprising chlorodiphenylamines having utility in controlling apple storage scald. These compounds are prepared by methods published in the literature.

---

This invention relates to an improved method for controlling the development of storage scald of apples, and more particularly it relates to an improved method of applying and producing extremely minute surface residues of diphenylamine derivatives on apples to prevent, control and/or retard the development of apple scald. It also relates to new formulations for utilizing the improved method for controlling the development of storage scald of apples.

Apple scald is a physiological disfunction which occurs in many varieties of apples at some time after harvesting the fruit, and in some seasons it may be particularly severe on fruit which has been placed in refrigerated storage, although the occurrence of this physiological disorder is not strictly limited to fruit which has been stored at cold temperatures. It may also occur on fruit which has been held at room or ambient temperature. Apple storage scald is characterized by a superficial browning of the apple surface affecting a few layers of cells directly below the cuticle. The unsightly appearance of the scalded apples lowers their market value, and the damage to the skin increased susceptibility to invasion by fungi. While scald affects most varieties of apples customarily held in refrigerated storage, some varieties are noticeably more susceptible than others. Rhode Island Greening, Northwestern Greening, Cortland, Stayman, Rome and Grimes are among the varieties highly susceptible to scald damage. Other varieties may be fairly resistant, yet in some seasons they are also subject to the disorder.

The exact nature of this disorder is still not fully known, notwithstanding the fact that extensive studies have been made of the various factors which are believed possibly to play a part in its development. Many variables relating to growing conditions of the fruit, nutrition of the fruit, nutrition of the fruit trees, conditions of storage, time of picking, etc. have been examined in efforts to discover the causes and nature of scald, extending back over the past thirty or more years. Substantially all of these efforts have been fruitless, and to date all hypotheses as to the causes of scald have had to be discarded as untenable, so that only empirical, highly unreliable and essentially ineffective remedies have heretofore been used by growers and storers of apples.

The magnitude of this problem becomes more apparent upon consideration of the facts that the occurrence of this disfunction is entirely unpredictable, both as to its latent presence and as to the severity of the outbreak. It is not now possible to determine in advance by any known tests or procedures whether or not scald will occur, and it is only after removing the fruit from storage and holding it or shipping it through the normal channels of commerce that the scald malady shows up. Thus the value of the entire contents of a cold storage fruit warehouse may be in jeopardy with no known remedy and with no possible way of predicting whether or not the fruit is storable at the time of placing it in storage, and whether or not the fruit will be salable shortly after removing it from storage. Since storage is basic to the apple industry and is necessary for the orderly and profitable use of each season's crop, it can be seen that scald presents an economic problem of great magnitude and importance, and that any methods whereby its very costly losses can be controlled is of tremendous nutritional and economic significance.

In recent years, it was shown in laboratory experiments that the application of a film of diphenylamine alone to apples, in the manner next described, reduced somewhat the incidence of scald. In these laboratory investigations, the chemical was dissolved in ethyl alcohol, a wetting agent was occasionally added, and the solution was poured into water in order to provide a dilute aqueous medium with which to treat the apples. These colloidal solutions containing a significant proportion of alcohol where then used to spray the fruit either before or after harvest, or the fruit was dipped in the solution for a short interval of time; the fruit was next allowed to dry or placed wet in cold storage.

A further major deterrent to the use of other organic solvents is the fact that governmental public health agencies have ruled that most organic materials which might be suitable as solvents have to be regarded as potentially deleterious or poisonous substances until their safety for use upon food products can be adequately established.

Attempts to overcome the above-described deficiencies of the laboratory method by micronizing the solid diphenylamine to a particle size in which the maximum dimension is about 250 microns constitute an expensive manufacturing alternative.

It is the object of the present invention to provide a more economical method for establishing and maintaining a scald preventive residue of a diphenylamine (DPA) derivative on apples on a commercial scale which avoids the aforementioned formulation difficulties.

It is a further object of the invention to give the grower an alternative scald control agent so as to enable him to meet governmental residue tolerances at harvest in the event the scald control treatment must be repeated.

It was unexpectedly found, according to the present invention, that readily prepared halogen derivatives of DPA are also scald control agents; moreover, they could be formulated so as to give greater practical efficiency and economy in their intended application. Typically, 3-chlorodiphenylamine can be conveniently formulated as both a wettable powder and as an emulsion concentrate, while diphenylamine is commercially available only as a wettable powder that requires the previously described micronizing (air-milling) step.

A further advantage of the present invention is that the treating solution prepared from the emulsion concentrate of this invention may be employed to treat the paper fruit wrappers prior to fruit wrapping, giving the desired scald inhibition effect. This is a convenient alternative method to direct topical application of the treating solution. A further advantage to wrapper treatment is avoiding the risk of loss of active ingredient during rainy periods that may occur subsequent to agent spraying but prior to harvest of apples.

Further objects and advantages of my invention, hereinafter described and illustrated in detail, will become apparent to those skilled in the art.

The diphenylamine derivatives employed in accordance with my invention are preferably material of high purity; in general, they should be over 99 mole percent pure and should contain less than 0.1 percent by weight of aniline as an impurity. Material of less rigid purity specifications can be employed and the impurities may be considered simply as inert, diluting ingredients.

The synthesis of the halogenated diphenylamines is well known and does not form a part of the invention of the present disclosure. Numerous references in the patent and general chemical literature teach practical means for manufacturing substituted diphenylamines. Specifically, U.S. Patent No. 2,924,620, issued Feb. 9, 1960, discloses a commercially proven process adaptable for the synthesis of halogenated diphenylamines, and of 3-chlorodiphenylamine in particular. In any event, persons skilled in the art of organic synthesis can readily provide practical methods of manufacture of halogenated diphenylamine.

The aqueous suspensions or emulsions employed according to the invention can be prepared in a number of ways. Emulsifying, stabilizing, and/or thickening agents can be added in the formulation of the intermediate wettable powder or emulsion concentrate. The presence of such agents in the halogenated DPA suspensions or emulsions would appear to have only a negligible effect upon the formation of the protective film. Such agents do not appear to be essential; as even without such additives, dispersions in aqueous media of useful stability can be attained.

Suitable suspending or emulsifying agents, for example, are the synthetic commercially available surface active agents of the sulfate or sulfonate type, such as, for example, alcohol sulfates, sodium lauryl sulfate, sodium dodecylbenzene sulfate, sodium alkyl naphthalene sulfonate, long chain alkl sulfonates, nonionic surfactants such as the polyethoxyethanol esters and ethers of fatty acids and alcohols, and the like.

Similarly, conditioning agents, such as commercially available, comminuted hydrated calcium silicates, and thickening agents such as methyl celluloses, may both be employed to improve the handling of the emulsion concentrate.

Additionally, the formulation of a wettable powder incorporating the scald control ingredients of this invention, solid carriers, such as fuller's earth, and emulsion stabilizing agents, such as lignosulfonates, may be beneficially incorporated.

Such wettable powders or emulsion concentrates may range widely in percent active ingredient as supplied to the grower for water dilution and use in the field. The active ingredient may range from 5 to 95% by weight of the formulation. The upper limit of the emulsion concentrate formable with a particular halogenated DPA is practically determined by the amount at which the suspension can be handled when it is so concentrated that it attains a thick pasty consistency. In the case of the wettable powder, the upper limit is somewhat lower, about 65%. The concentrates are substantially diluted down, as hereinafter more fully described, for application to the fruit in accordance with the invention.

The halogenated DPA powders or emulsions prepared as taught herein are made ready for direct application simply by diluting down the more concentrated preparations above described in water so as to result in a suspension or emulsion containing from about 0.02 percent to about 1.0 percent of the halodiphenylamine. In most instances, the preferred range of useful concentrations will be from about 0.05 to about 0.35 percent. These dilute diphenylamine suspensions or emulsions can be applied to the surface of apples for reducing and preventing the development of scald in a number of ways, such as, for example, by spraying the suspensions or emulsions on to the apples after they have been harvested, or during grading, or after packing, or the apples may simply be dipped in the suspensions or emulsions and then allowed to drain and dry or placed wet in the storage rooms wraps.

The particular manner in which these suspensions or emulsions are applied will in some degree determine the most effective concentration of finely divided active ingredient suspension or emulsion to be used. Thus, for example, in using tree spraying prior to harvest, where there is bound to be less efficient use of the material being applied as compared with sprays directed on to the harvested fruit itself, or as compared to the use of a fruit dip as the means of fruit treatment, higher concentrations are generally required than when more efficient means of application are chosen. In general, for tree sprays, concentrations of the order of 0.3 percent or higher may be desirable, whereas for dip treatments concentrations of the order of 0.1 to 0.2 percent are preferred. Even higher concentrations may be required for effective prevention or reduction of scald incidence in the case of tree sprays in some instances, depending upon such factors as the output of the spray machinery, the pattern of coverage, and the speed at which the spray equipment is drawn through the orchard.

Typical scald-reducing and scald-preventing concentrate compositions and examples of the use of these compositions in the practice of this invention are shown below. These examples illustrate the superior effectiveness of the process according to the invention and the extraordinary scald protection afforded by the method of the invention, it being understood that these are cited for purposes of illustration only, and not for purposes of limitation.

Example 1

3-chlorodiphenylamine (SK&F No. 6975) of over 99% purity is compounded into a 50% wettable powder of the components listed below:

TABLE I.—SK&F NO. 6975—WETTABLE POWDER 50%

| Formula | Percent w./w. | Amount Used, g. |
| --- | --- | --- |
| SK&F No. 6974 | 50.5 | 505.0 |
| Micro-Cel E [a] | 22.5 | 225.0 |
| Attasorb, RVM [b] | 23.0 | 230.0 |
| Duponol ME [d] | 1.0 | 10.0 |
| Marasperse, N [e] | 1.0 | 10.0 |
| Methocel [f] | 2.0 | 20.0 |

[a] Attasorb is used instead of Attaclay because this batch is not air milled.
[b] A comminuted hydrated calcium silicate marketed by Johns-Manville.
[c] Fuller's earth product of Minerals & Chemicals Corp. of America.
[d] Alcohol sulfate surfactant manufactured by the Du Pont Co.
[e] Lignosulfonate emulsion stabilizers marketed by Marathon Co.
[f] Methyl cellulose thickening agent manufactured by Dow Chemical Co.

A homogeneous dry formulation is accomplished by geometric dilution mixing of the additive powders in a dry mixing vessel. The active ingredient is then added slowly. The final admixture is transferred to a Waring blender for several minutes to mix thoroughly.

A 100 gallon batch of dilute SK&F No. 6975 suspension is prepared by diluting 0.2 lb. of this 50% wettable powder with water to result in an agent treating concentration of 1000 parts per million. A bushel of freshly harvested Rhode Island Greening apples is immersed in this suspension until thoroughly wet. They are placed in polyethylene film liners at 70° C. and 90 percent relative humidity. One bushel of apples is used for each candidate chemical and at each of two concentrations tested.

Aliquots of each thus treated bushel are stored for four and six week intervals.

Example 2

3-chlorodiphenylamine (SK&F No. 6975) of over 99% purity is compounded into a 90% emulsion concentrate of the components listed below:

TABLE II.—SK&F NO. 6975—EMULSION CONCENTRATE 90%

| Formula | Percent w./w. | Amount Used, |
| --- | --- | --- |
| SK&F No. 6975 | 90.0 | 909.0 |
| Micro-Cel, E [a] | 7.0 | 70.0 |
| Methocel [b] | 2.0 | 20.0 |
| Duponol ME [c] | 1. | 10.0 |

[a] A comminuted hydrated calcium silicate marketed by Johns-Manville.
[b] Fuller's earth product of Minerals & Chemicals Corp. of America.
[c] Alcohol sulfate surfactant manufactured by the Du Pont Co.

A homogeneous formulation of the emulsion is accomplished by a geometric dilution mixing of the additive powders in a dry mixing vessel. The active ingredient is then added slowly with mixing until a uniform thick suspension is obtained.

A 100 gallon batch of dilute SK&F No. 6975 suspension is prepared by diluting 0.11 gallon of this 90% emulsion concentrate with water to result in an agent treating concentration of 1000 parts per million. One bushel of Rhode Island Greening apples is treated and stored as previously described for each chemical and concentration.

Example 3

An 83% wettable powder of diphenylamine is obtained commercially from Chemley Bros., Chicago, Illinois and made up in both dilutions indicated above per instruction on the package for the treatment of Rhode Island Greening apples with storage handling exactly as previously described.

The scald indexes for all the candidate chemicals and control at the varied conditions are shown in Table III.

TABLE III

| Candidate Chemical | Conc., p.p.m. | Scald | | | | | |
|---|---|---|---|---|---|---|---|
| | | Slight | | Severe | | Total | |
| | | 4 wks., Percent | 6 wks., Percent | 4 wks., Percent | 6 wks., Percent | 4 wks., Percent | 6 wks., Percent |
| Control | | 37 | 54 | 5 | 13 | 42 | 67 |
| SK&F No. 6975, 50% wettable powder | 1,000 | 0 | 0 | 0 | 0 | 0 | 0 |
| Do | 2,000 | 0 | 0 | 0 | 0 | 0 | 0 |
| SK&F No. 6975, 90% emul. conc | 1,000 | 0 | 0 | 0 | 0 | 0 | 0 |
| SK&F No. 6975, 90% emul. conc | 2,000 | 0 | 0 | 0 | 0 | 0 | 0 |
| Diphenylamine, 83% wettable powder | 1,000 | 0 | 0 | 0 | 0 | 0 | 0 |
| Do | 2,000 | 0 | 0 | 0 | 0 | 0 | 0 |

It is apparent that both types of formulations of the compounds of the present invention are equally as effective as the prior art agent which can be formulated only as wettable powder after the necessary micronizing step.

Various modifications and alterations of this invention will become apparent to those skilled in the art without departing from the scope and spirit of the invention, and it should be understood that the latter is not necessarily limited to the aforementioned disclosure.

What is claimed is:

1. A method of controlling apple storage scald which comprises applying topically to apples an effective amount of a scald reducing formulation containing at least 0.02 percent of a chlorodiphenylamine as the essential active ingredient dispersed in an essentially organic solvent-free aqueous dispersion.

2. The method of claim 1 wherein said ingredient is 3-chlorodiphenylamine.

3. An apple scald inhibiting wettable powder comprising a chlorodiphenylamine, surface active agent, and an inert solid carrier therefor.

4. An apple scald inhibiting dry emulsion concentrate comprising a comminuted chlorodiphenylamine, a conditioning agent, and an alcohol sulfate surface active agent.

5. An apple scald inhibiting wettable powder comprising 3-chlorodiphenylamine, surface active agent and an inert solid carrier therefor.

6. An apple scald inhibiting dry emulsion concentrate comprising comminuted 3-chlorodiphenylamine, a conditioning agent, and a surface active agent.

References Cited

UNITED STATES PATENTS 3,034,904  5/1962  Kleiman _____ 99—154

A. LOUIS MONACELL, *Primary Examiner.*

M. VOET, *Assistant Examiner.*